United States Patent Office 3,278,555
Patented Oct. 11, 1966

3,278,555
POLYDIOXANES
Calvin F. Ward, Carmichael, Calif., assignor to The Dow Chemical Company, Midland, Mich., a corporation of Delaware
No Drawing. Filed Mar. 14, 1963, Ser. No. 265,035
11 Claims. (Cl. 260—340.6)

This invention relates to new compositions of matter and to methods for manufacturing such compositions. More particularly, the present invention relates to heterocyclic compounds which contain at least two p-dioxane rings in the molecule and to methods for preparing these poly-p-dioxanes.

Monodioxanyl polyethers are disclosed by Lorette in U.S. Patent No. 2,843,601. Numerous substituted and condensed ring 1,4-dioxanes are disclosed by Stumpf in "Chemie und Anwendungen des 1,4-Dioxans" (1956). In addition, compounds which contain two 1,3-dioxane rings in the molecule are known in the literature. Such compounds are disclosed by Johannes Wöllner in Chem. Ber., 93, 888-95 (1960). In these compounds, however, the dioxane rings are attached either by hydrocarbon chains or form condensed ring structures with a pyran ring. Polydioxolane compounds such as the bis(2-methyl-1,3-dioxolan-4-yl methyl) acetal of acetaldehyde are also known. These compounds contain only 5-membered heterocyclic rings and are obtained (along with other products) in a small yield be reacting ethyl alcohol and trivinyl glyceryl ether in the presence of a trace of hydrochloric acid.

It is an object of the present invention to provide a new class of heterocyclic poly-p-dioxane compounds wherein each dioxanyl group is separated from every other dioxanyl group by an organic linkage which contains at least one oxygen atom. A further object of the invention is to provide a process for the preparation of poly-p-dioxanyl polyether compounds.

It has now been found that theses and other objects may be accomplished by reacting a dihydroxy compound with an epihalohydrin, reacting the product thus obtained with an oxirane compound, and thereafter reacting the product from this second step with a base. The compounds which are prepared by this process may be characterized as poly-p-dioxanyl polyether compounds with from 2 to 4 p-dioxanyl groups (preferably 1,4-dioxan-2-yl methyl groups), at least two acyclic ether linkages, from 10 to 300 carbon atoms, and with a molecular weight up to about 3,000. Ordinarily, these compounds are composed only of C, H, O and N atoms and must contain at least six oxygen atoms.

A preferred subclass of the compounds of this invention may be represented by the following general formula

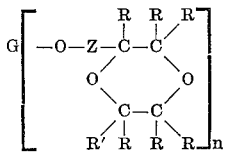

wherein $n$ is an integer from 2 to 4, G is a polyvalent organic residue of from 2 to 300 carbon atoms derived from an organic polyol by removal of the hydroxyl groups with a total number of bonds equal to $n$, Z is a divalent aliphatic hydrocarbon group (preferably saturated) of from 2 to 4 carbon atoms, and each of R and R' is either a hydrogen atom or a monovalent hydrocarbon group of from 1 to 10 carbon atoms. Suitable divalent Z groups include alkylidene groups of from 1 to 4 carbon atoms such as methylene, ethylidene, propylidene and butylidene groups. The preferred Z group is the simple methylene group: —CH$_2$—. Suitable G groups include the polyvalent radicals derived from polyhydroxy compounds by removal of the hydroxyl groups. Thus, the groups:

—CH$_2$CH$_2$—O—CH$_2$—CH$_2$—(3-oxapentylene)

—(CH$_2$)$_3$—O—(CH$_2$)$_3$—(4-oxaheptylene)

—CH$_2$CH$_2$—N—CH$_2$CH$_2$—(3-azapentylene)
           |
           H

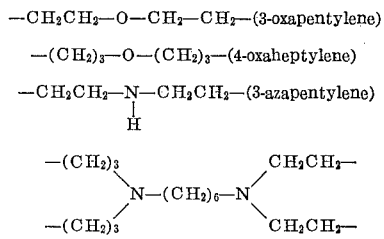

and

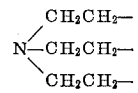

are derived from the corresponding polyhydric compounds: diethylene glycol, dispropylene glycol, diethanolamine, N,N, - di(2 - hydroxyethyl)-N',N'-di(3-hydroxypropyl)hexamethylene diamine, and triethanolamine, respectively. G may also be derived from polyalkylene glycols of the type:

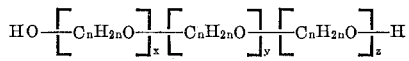

wherein $n$ is an integer from 2 to 4 (for each value of $x$, $y$ or $z$) and $x$, $y$ and $z$ are integers of from 0 to 40, such that the sum of $x$, $y$ and $z$ has a value from 1 to 40. Thus, G may be derived from mixed polyalkylene glycols composed of varying amounts of oxyethylene, oxypropylene and oxybutylene groups by removal of the two hydroxyl groups. G may be derived from a polyalkanol polyamine of up to 20 (preferably 15) carbon atoms with from 2 to 4 lower alkanol groups (which may be the same or different) and from 1 to 4 amino nitrogen atoms by removal of the hydroxyl groups from the polyalkanol polyamine. When R and R' are hydrocarbon groups of up to 10 carbon atoms, R and R' may be alkyl groups of from 1 to 10 carbon atoms (preferably lower alkyl groups of from 1 to 4 carbon atoms such as methyl, ethyl, n-propyl, i-propyl, n-butyl, sec.-butyl, isobutyl and tert.-butyl), cycloalkyl groups of from 3 to 6 ring carbons (such as cyclopropyl, cyclobutyl, pentamethylcyclopentyl, cyclopentyl, 2-ethylcyclohexyl and cyclohexyl), and aryl groups (such as phenyl, benzyl, tolyl, xylyl, cumyl, duryl, phenethyl and naphthyl groups). Compounds wherein R' is a lower alkyl group of from 1 to 4 carbon atoms and every R is hydrogen form a particularly useful class of poly-p-dioxanyl polyethers.

The poly-p-dioxanyl polyether compounds of the invention may be prepared by reacting a polyol with an epihalohydrin to form a polyhalohydrin ether intermediate, reacting this polyhalohydrin ether with an oxirane compound to form an oxyalkyated intermediate, and dehydrohalogenating the oxyalkylated product with a base to form the corresponding poly-p-dioxanes. The process can be illustrated by the following reaction sequence:

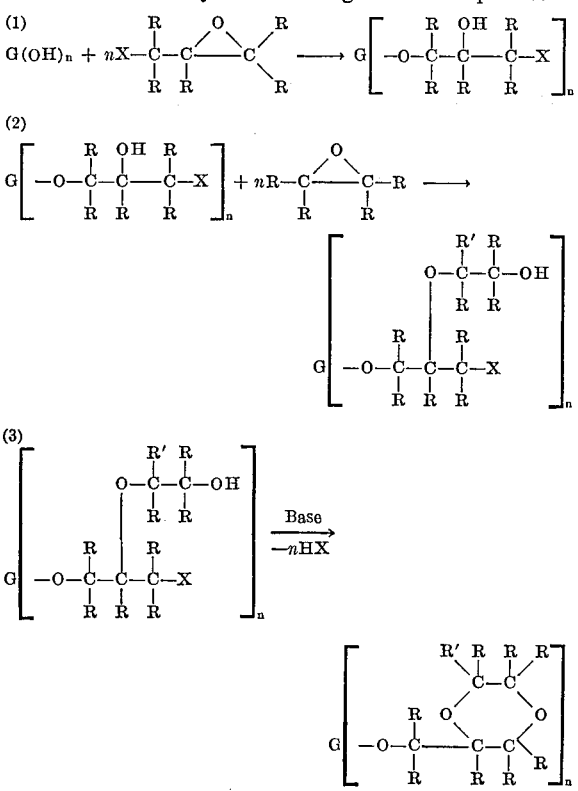

wherein X is a halogen (preferably Cl, Br), $n$ is an integer from 2 to 4 and G, R' and R are as previously defined. As can be seen by the foregoing reactions, selection of the proper starting materials allows the preparation of a wide variety of substituted and unsubstituted poly-1,4-dioxanes. The process may be further illustrated by the following examples:

(a)

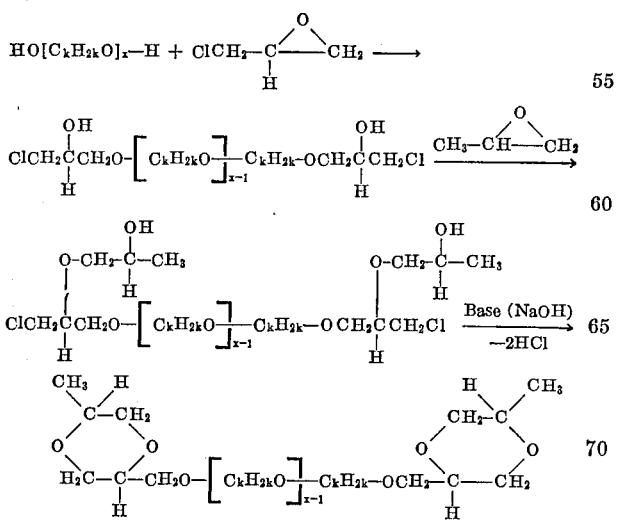

wherein $x$ is an integer from 1 to 40 and $k$ is an integer from 2 to 4.

(b)

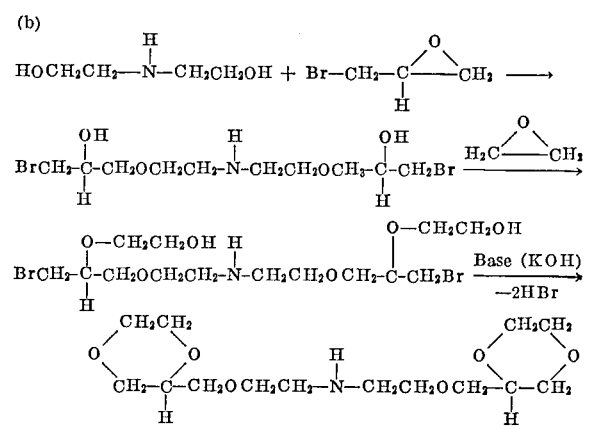

(The bis(1,4-dioxan-2-yl methyl) diether of diethanolamine).

(c)

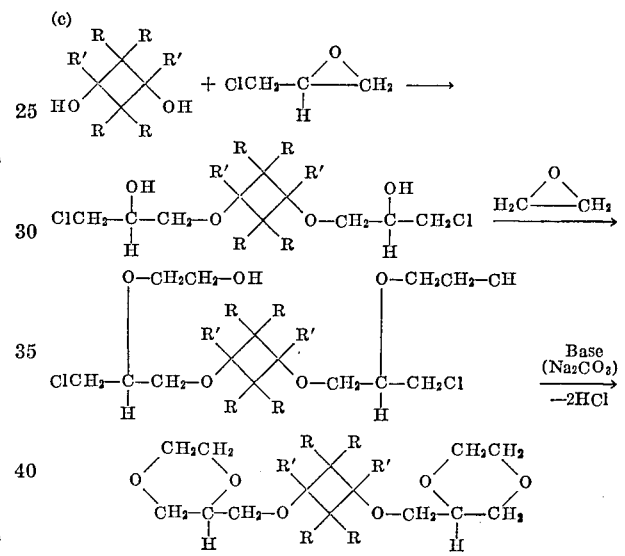

wherein R and R' are hydrogen or a lower alkyl group. R' is preferably a hydrogen atom and R is preferably a lower alkyl group of from 1 to 4 carbon atoms, such as methyl, ethyl and the isomeric propyl and butyl groups.

(d)

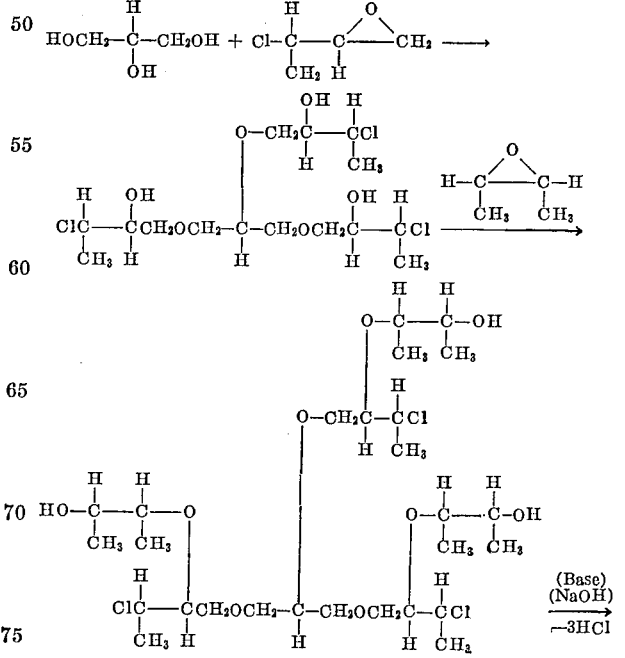

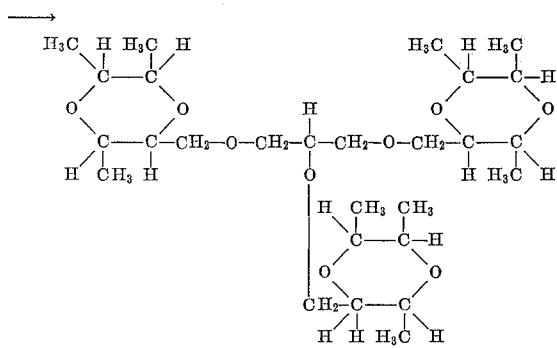

In the foregoing equations, it is to be understood that when unsymmetrical epoxyalkanes (such as 2,3-epoxypentane, 1,2-epoxybutane and propylene oxide) are employed in the reaction, mixtures of various isomeric polydioxane compounds result in addition to the indicated products.

Any organic compound which contains from 2 to 4 hydroxyl groups capable of reacting with an epoxide compound (alkylene oxide or epihalohydrin) may be used as a starting material in the process of the present invention. Suitable polyhydric compounds which may be used as starting materials in the process include the alkylene glycols such as ethylene glycol, propylene glycols, butylene glycols and mixtures of polyalkylene glycols with molecular weights up to about 3,000. Polyhydric aryl compounds include such compounds as bisphenol-A, 4,4'-isopropylidene-bis(2,6-dichlorophenol), 2,2-bis(4-hydroxyphenyl)butane, catechol and lower alkyl-substituted catechols (such as 4-methylcatechol and 4-tert.-butylcatechol). Polyhydroxy alkanes and polyhydroxy cycloalkanes, such as 1,3-dihydroxybutane, 3,4-dimethyl-3,4-hexanediol, 1-ethyl-3,4-cyclopentanediol, 1,2,3 - hexanetriol, 1,2,3-cyclohexanetriol and 2,2,4,4-tetraethyl-1,3-cyclobutanediol may also be used. Cycloalkane polyols of from 3 to 7 ring carbon atoms (preferably from 4 to 6 ring carbon atoms) with from 2 to 4 hydroxyl groups and a total of up to 12 carbon atoms, wherein the only substituents are lower alkyl groups, may be used. Other examples of suitable polyhydroxy starting materials include alkanolamines wherein the alkanol moiety contains from 1 to 10 carbon atoms, such as trimethanolamine (Science, 126, p. 206, 1957), diethanolamine, tripropanolamine and N,N'-tetraalkanol polymethylenediamines, such as N,N,N',N'-tetraethanolhexamethylenediamine and N,N,N',N'-tetraalkanol ethylenediamines such as N,N,N',N'-tetrapropanol ethylenediamine and N,N,N',N'-tetrabutanol ethylenediamine.

The epihalohydrin reactant is characterized by the formula

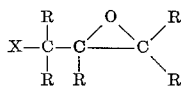

wherein X and R are as defined in reaction (1). X is preferably a middle halogen (Cl and Br). Examples of such compounds include epibromohydrin, epichlorohydrin, 3-chloro-1,2-epoxybutane, 3-bromo-1,2-epoxypentane, 1-chloro-2,3-epoxybutane and 2-chloro-2-methyl-3,4-epoxypentane. In general, any mono-halogenated epoxyalkane of up to 20 carbon atoms wherein the halogen atom is attached to a carbon atom adjacent to the epoxy group may be used in the process.

The oxirane reactant is composed only of carbon, hydrogen and oxygen atoms and contains a single epoxy group. Suitable epoxides include the alkylene oxides represented by the formula

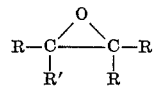

wherein R' and R are as defined in Equation 2. Lower alkylene oxides (with from 2 to 4 carbon atoms) such as ethylene oxide, propylene oxide and the butylene oxides may be used in the process. The preferred epoxides are the alkylene oxides which contain a terminal epoxy group represented by the formula

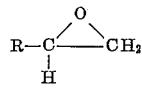

wherein the R group is hydrogen or lower alkyl radical.

The condensation of the epihalohydrin and polyhydric compound is carried out at temperatures of from 20° to 125° C., with temperatures of from 30° to 80° C. being preferred. The condensation may be carried out stepwise or continuously (adding sufficient epihalohydrin so that one molecule of epihalohydrin is available for each hydroxyl group which is to be reacted). A catalyst such as a Lewis acid is generally employed in order to reduce the reaction time. Suitable Lewis acids which may be used include $BF_3$, $SnCl_4$, $AlCl_3$ and the like as well as the etherates and complexes of these acids such as boron trifluoride etherate and $BF_3$-propylene glycol complex. Only a catalytic amount of Lewis acid promotes the reaction, although amounts of catalyst of up to about ten percent by weight of the total reaction mass may be used. Ordinarily, from about 0.02 to about 0.2 percent by weight of Lewis acid based upon the weight of the total reactants is sufficient. Catalysts which are particularly effective when epihalohydrins are condensed with cyclic or aromatic polyols are tertiary amines, such as the trialkylamines wherein the alkyl group contains from 1 to 10 carbon atoms, especially the tri(loweralkyl)amines, such as trimethylamine, triethylamine, tripropylamines and tributylamines. Tripentylamines, trihexylamines, triheptylamines, trioctylamines, trinonylamines, tridecylamines and mixed trialkylamines, such as methylethylpropylamine, diethylbutylamine and dimethylethylamine may also be used.

The condensation of the epihalohydrin and polyol (forming a polyhalohydrin condensation product) may be carried out under reduced pressure (down to 1 or 2 millimeters of mercury) or at superatmospheric pressure (up to about 100 atmospheres). The condensation is ordinarily carried out at atmospheric pressure.

The second step of the process comprises adding an epoxide such as an alkylene oxide to the polyolepihalohydrin condensation product. An amount of alkylene oxide which is approximately molecularly equal to the amount of epihalohydrin used is then added to this first condensation product to form a second oxy alkylated condensation product. The second condensation is carried out at temperatures of from 10° to 80° C. and preferably at about 40° C. Pressures of from 1 mm. of Hg to about 100 atmospheres may be used. The last stages of the digestion are ordinarily carried out at reduced pressure (1–3 mm. of Hg) to remove any unreacted alkylene oxide.

The second condensation product (an oxyalkylated polyhalohydrin polyether) is then dehydrohalogenated and cyclized by reaction with a base. Any base suitable for dehydrohalogenation may be used. Examples of such bases include the alkali metal (and alkaline earth metal) salts of weak acids such as $Na_2CO_3$, $K_2CO_3$, $LiHCO_3$, $CaCO_3$, $Na_2B_4O_7$, $Na_3PO_4$ and the corresponding hydroxides and alkoxides such as NaOH, $Ca(OC_2H_5)_2$, LiOH, KOH, $KOC_4H_9$ and $Ca(OH)_2$. The dehydrohalogenation is generally carried out at temperatures of from about 10° to 130° C. When a solvent is employed, water is generally used. Any solvent which is inert to the reactants and products under the process conditions is suitable. Thus, such compounds as the lower alkanols (methanol, ethanol and the isomeric propanols and butanols) are suitable solvents.

The poly-p-dioxanyl polyether compounds of the present invention are useful as reactive diluents for resins (especially polyether resins derived from bisphenol-A), non-reactive diluents, resin solvents and plasticizers. The higher molecular weight compounds are useful as fillers for thermosetting plastics.

The following examples are submitted for the purpose of illustration only and are not to be construed as limiting the scope of the invention in any way. In the structural formulas of the examples, it is to be understood that hydrogen atoms are attached to all of the unsatisfied valences of the formulas.

*Example I*

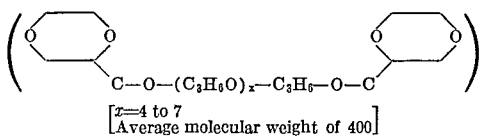

[x=4 to 7
Average molecular weight of 400]

Into a reaction vessel equipped with a means for stirring and temperature control was placed 172.8 grams of polypropylene glycol having an average molecular weight of 400 and 127.2 grams of epichlorohydrin was added thereto dropwise over a fifty minute period at a temperature of 40° C. The catalyst employed in this step was 0.7 gram of boron trifluoride etherate (48 percent $BF_3$ in diethyl ether). The mixture was digested at 45° C. for one hour and 19.2 grams of ethylene oxide was then added dropwise over a 55 minute period. The mixture was digested for an additional hour at 40° C. and then 30 grams of flake sodium hydroxide was added. This mixture was digested at 80° C. for two hours, cooled to 40° C., and an additional 19.2 grams of ethylene oxide was added dropwise over a three-hour period. At the end of this time, 226 grams of a 25 percent sodium hydroxide-water solution was added and the mixture was digested for two hours. The final 30 minutes of digestion was carried out at reduced pressure (2 mm. of Hg). The product (the bis(1,4-dioxan-2-yl methyl) diether of the polypropylene glycol) was filtered and had the following properties:

Specific gravity of 1.036 at 25° C.
Refractive index of 1.4408 at 23° C. (D line of Na)
Viscosity at 210° F. of 5.3 centistokes

*Example II*

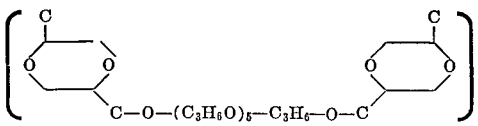

The bis(5-methyl-1,4-dioxan-2-yl methyl) diether of hexapropylene glycol was obtained by repeating Example I using 25.3 grams (for each addition) of propylene oxide in place of the ethylene oxide used in Example I.

*Example III*

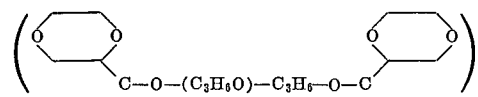

Into a reaction vessel similar to that employed in Example I were placed 74 grams of dipropylene glycol (HO—$(C_3H_6O)_2$H). Epichlorohydrin (126 grams) was added dropwise over a 50 minute period while maintaining the temperature at about 40° C. Boron trifluoride etherate (2.0 grams composed of 48 percent $BF_3$ in diethyl ether) was used as a catalyst. Upon completion of the addition of epichlorohydrin, the mixture was digested at 45° C. for one hour. Ethylene oxide (26.7 grams) was then added dropwise over a 55 minute period and the mixture digested for one hour at 40° C. At the end of this digestion, flake sodium hydroxide (44.8 grams) was added and the mixture was digested at 80° C. for two hours. The mixture was then cooled to 40° C. and an additional quantity of ethylene oxide (24.7 grams) was added dropwise over a three hour period. Sodium hydroxide (152 milliliters of a 30 percent by weight water solution) was then added and the mixture digested at 80° C. for 2 hours. The final 30 minutes of the digestion was carried out at 2 mm. of Hg pressure. The product (the bis(1,4-dioxan-2-yl methyl) diether of dipropylene glycol) was separated by filtration and had the following properties:

$n_D^{25}=1.442$
Specific gravity (25° C.)=1.017
Viscosity (210° F.)=3.7 centistokes
(light amber colored liquid)

*Example IV*

Diethanolamine (300 grams) was placed into a reaction vessel equipped with a means for stirring, temperature control and refluxing. The temperature was raised to 80° C. and epichlorohydrin (250 grams) was added. When the reaction slowed down, boron trifluoride etherate (3 milliliters of a 48 percent solution in diethyl ether) and stannic chloride (1.5 milliliters of a 48 percent solution in diethyl ether) were added as catalysts. Additional epichlorohydrin (841 grams) was then added while maintaining the temperature at 50° C. Upon completion of the addition of the epichlorohydrin, the mixture was cooled to 18° C. and maintained at this temperature while ethylene oxide (1257 grams) was added dropwise. A caustic solution (125.6 grams of sodium hydroxide in methanol) was added to the mixture and the mixture was digested at 47° C. for one hour. The methanol solvent was removed under reduced pressure and additional ethylene oxide (125.7 grams) was added dropwise over a 5 hour period while maintaining the temperature at 24° C. At the end of this period, sodium hydroxide (251.2 grams in 600 grams of methanol) was again added and the mixture digested for another hour. The product (a bis(1,4-dioxan-2-yl methyl) ether) was obtained in the form of an amber colored liquid. Similar results are obtained with aminoethylethanolamine in place of diethanolamine.

*Example V*

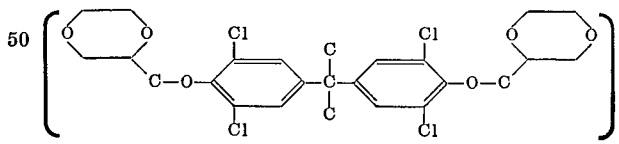

Into a reaction vessel equipped with a means for stirring and temperature control were placed 100 grams of tetrachloro bisphenol-A [4,4′-isopropylidene-bis(2,6-dichlorophenol)], 3.07 grams of triethylamine and 206.8 grams of epichlorohydrin. The mixture was stirred at room temperature for one day and then allowed to remain at room temperature with intermittent stirring for 8 days. Volatile materials were removed under reduced pressure and one milliliter of $BF_3$ etherate (48 percent solution in diethyl ether) was added to the mixture. Ethylene oxide (12.4 grams) was added dropwise while maintaining the temperature at 12° C. Upon completion of the ethylene oxide addition, flake sodium hydroxide (20 grams) was added. The mixture was digested for one hour at 40° C., cooled at 15° C., 12.4 grams of ethylene oxide was added and upon completion of the ethylene oxide addition, 12.3 grams of flake sodium hydroxide was added. The mixture was again digested for one hour at 40° C. and, upon cooling, the product was removed by dissolving it in 200 milliliters of toluene. Upon removal of the toluene, the bis(1,4-dioxane-2-yl methyl)

diether of 4,4'-isopropylidenebis(2,6-dichlorophenol) was obtained as an amber colored liquid.

*Example VI*

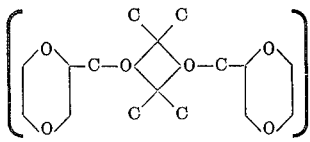

Using a procedure and apparatus similar to that employed in Example III, a mixture of 71 grams of 2,2,4,4 - tetramethyl - 1,3 - cyclobutanediol, 276 grams of epichlorohydrin and 1.63 grams of triethylamine catalyst was heated for six hours at 120° C. Ethylene oxide (22 grams) was added and, upon digestion of the ethylene oxide, sodium hydroxide (22 grams) was added to the mixture. The mixture was digested for one hour at about 40° C. and then for one hour at 80° C. followed by a second addition of ethylene oxide (22 grams) and sodium hydroxide (22 grams). The final product was bis(1,4-dioxan-2-yl methyl) diether of 2,2,4,4-tetramethyl-1,3-cyclobutanediol.

*Example VII*

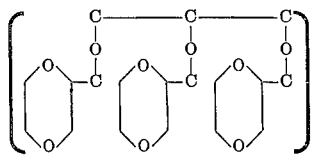

Using an apparatus and procedure similar to that employed in the foregoing examples, the tris(1,4-dioxan-2-yl methyl) triether of glycerol was prepared.

A mixture of 200 grams of glycerol, 600 grams of epichlorohydrin and 4 grams of $BF_3$ etherate catalyst was heated for about 1 hour at 40° C. After the digestion was completed, the tris(halohydrin) polyether thus formed was reacted with three successive portions of ethylene oxide (95.7 grams each addition) and base (87 grams of NaOH each addition) according to the procedure of Example IV. The final product, after separation from the reaction mixture, was the tris(1,4-dioxan-2-yl methyl) triether of glycerol.

Similarly, the tetrakis(1,4-dioxan-2-yl methyl) tetraether of N,N,N'N'-tetraethanol-ethylenediamine may be obtained by reacting N,N,N'N'-tetraethanol-ethylenediamine with 4 moles of epichlorohydrin and 4 moles of ethylene oxide, successively closing the dioxane ring after each ethylene oxide addition.

I claim as my invention:

1. A compound of the formula

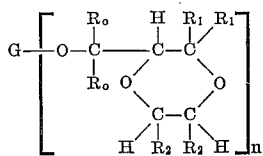

wherein:
(a) $n$ is an integer of from 2 to 4,
(b) G is the residue of an organic polyol of from 2 to 4 hydroxyl groups, containing from 2 to 300 carbon atoms,
(c) each $R_o$ is independently a group of the formula $(C_kH_{2k})H$ wherein k is an integer of from 0 to 4,
(d) each $R_1$ is independently selected from the group consisting of the hydrogen atom, methyl and ethyl, and
(e) each $R_2$ is independently selected from the group consisting of the hydrogen atom and a lower alkyl group of from 1 to 4 carbon atoms.

2. A compound of the formula

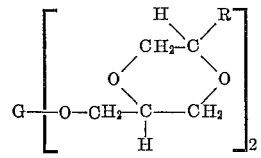

wherein G is the residue of polypropylene glycol with no more than 40 oxypropylene units and R is a lower alkyl group.

3. The bis(1,4-dioxan-2-yl methyl) diether of diethanolamine.
4. The bis(1,4-dioxan-2-yl methyl) diether of 4,4'-isopropylidenebis(2,6-dichlorophenol).
5. The tris(1,4-dioxan-2-yl methyl) triether of glycerol.
6. The tetrakis(1,4-dioxan-2-yl methyl) tetraether of N,N,N',N'-tetraethanol-ethylenediamine.
7. The bis(1,4-dioxan-2-yl methyl) diether of 2,2,4,4-tetramethyl-1,3-cyclobutanediol.
8. A compound of the formula

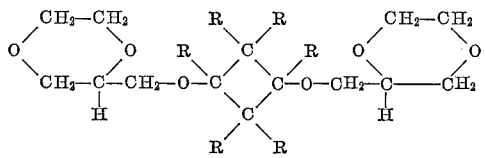

wherein each R is a group of the formula $(C_kH_{2k})H$ in which k is an integer of from 0 to 4.

9. A process for preparing poly-p-dioxanyl polyethers which contain at least one nitrogen atom which comprises:
(a) reacting a polyalkanol polyamine of up to 20 carbon atoms containing from 2 to 4 lower alkanol groups and from 1 to 4 nitrogen atoms in the molecule with epichlorohydrin to form a poly(chlorohydrin) intermediate,
(b) reacting said poly(chlorohydrin) intermediate with a lower alkylene oxide to form an oxyalkylated condensation product,
(c) contacting said oxyalkylated condensation product with a base.

10. A process for preparing poly-p-dioxanyl polyethers which comprises:
(a) reacting a polyalkylene glycol containing from 1 to 40 lower alkylene groups with an epihalohydrin wherein the halo moiety is selected from the group consisting of chlorine and bromine to form the corresponding poly(halohydrin) intermediate,
(b) reacting said poly halohydrin) intermediate with about one mole or lower alkylene oxide per mole of epihalohydrin reacted to form an oxyalkylated condensation product,
(c) reacting said oxyalkylated condensation product with at least one mole of base per mole of epihalohydrin reacted.

11. A process for preparing a poly-p-dioxanyl polyether which comprises:
(a) reacting an epihalohydrin with an organic polyol containing from 2 to 300 carbon atoms with from 2 to 4 hydroxyl groups to give a product which contains to a halohydrin group in place of each hydroxyl group consumed.
(b) reacting said product with one mole of a lower alkylene oxide for each mole of epihalohydrin reacted to form an oxyalkylated condensation product, and
(c) dehydrohalogenating said oxyalkylated condensation product with a base.

No references cited.

WALTER A. MODANCE, *Primary Examiner.*

DON M. KERR, NORMA S. MILESTONE,
*Assistant Examiners.*